United States Patent
Zeng et al.

(10) Patent No.: US 9,552,125 B2
(45) Date of Patent: Jan. 24, 2017

(54) INPUT METHOD EDITOR

(75) Inventors: Jian Zeng, Beijing (CN); Liangyi Ou, Beijing (CN); Wei Sun, Beijing (CN); Xiangye Xiao, Beijing (CN); Yinfei Zhang, Shanghai (CN); Yonggang Wang, Beijing (CN); Yuanbo Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 625 days.

(21) Appl. No.: 13/698,967

(22) PCT Filed: May 21, 2010

(86) PCT No.: PCT/CN2010/073052
§ 371 (c)(1),
(2), (4) Date: Feb. 6, 2013

(87) PCT Pub. No.: WO2011/143827
PCT Pub. Date: Nov. 24, 2011

(65) Prior Publication Data
US 2013/0132871 A1 May 23, 2013

(51) Int. Cl.
*G06F 3/048* (2013.01)
*G06F 3/01* (2006.01)

(52) U.S. Cl.
CPC .............. *G06F 3/048* (2013.01); *G06F 3/018* (2013.01)

(58) Field of Classification Search
None
See application file for complete search history.

(56) References Cited

U.S. PATENT DOCUMENTS 5,778,404 A 7/1998 Capps et al.
6,848,080 B1 * 1/2005 Lee et al. ................. 715/203
(Continued)

FOREIGN PATENT DOCUMENTS

CN 87108006 6/1988
CN 1581031 2/2005
(Continued)

OTHER PUBLICATIONS

Typing and Moving Around in Word Processing, by Greg Perry, Jul. 11, 2003.*

(Continued)

*Primary Examiner* — Matt Kim
*Assistant Examiner* — Mahelet Shiberou
(74) *Attorney, Agent, or Firm* — Remarck Law Group PLC

(57) ABSTRACT

Methods, systems, apparatus, including computer program products for browsing and editing input for an input method editor. In one implementation, a method is provided. The method includes receiving an input sequence of characters in a first writing system; identifying in the input sequence of characters one or more first subsequences of consecutive characters, where each subsequence represents a syllable in a different, second writing system; identifying in the input sequence of characters one or more second subsequences, where each second subsequence includes one or more consecutive first subsequences and represents a term in the different, second writing system; determining one or more boundaries that delimit the one or more second subsequences; and generating one or more selectable indicators for display in a user interface, where each of the one or more selectable indicators identifies a respective second subsequence delimited by the one or more boundaries.

21 Claims, 15 Drawing Sheets

(56) References Cited

U.S. PATENT DOCUMENTS

| | | |
|---|---|---|
| 8,276,099 B2 | 9/2012 | Yost |
| 2006/0009965 A1 | 1/2006 | Gao et al. |
| 2008/0312911 A1* | 12/2008 | Zhang .............................. 704/10 |
| 2010/0023514 A1* | 1/2010 | Parikh ............................... 707/6 |
| 2012/0016658 A1* | 1/2012 | Wu et al. .......................... 704/3 |
| 2013/0132871 A1 | 5/2013 | Zeng et al. |

FOREIGN PATENT DOCUMENTS

| | | |
|---|---|---|
| CN | 1797291 | 7/2006 |
| CN | 101661331 A | 3/2010 |

OTHER PUBLICATIONS

Microsoft Office, Microsoft Word 2010—Product Guide.*
Microsoft Word MVP FAQ Site, by Suzanne Barnhill and Dave Rado, Jul. 17, 2009.*
International Search Report and Written Opinion in International Application No. PCT/CN2010/073052, mailed Mar. 3, 2011, 8 pages.
International Preliminary Report on Patentability in International Application No. PCT/CN2010/073052, mailed Dec. 6, 2012, 12 pages.

* cited by examiner

After releasing CTRL pin yin shu ru fa de gong neng|
1.拼音输入法的功能 2.拼音输入法 3.拼音输入 4.拼音 5.品

FIG. 8

When pressing CTRL

⁰pin yin ¹shu ru fa ² de ³ gong neng|
1.拼音输入法的功能 2.拼音输入法 3.拼音输入 4.拼音 5.品

FIG. 9

Pressing CTRL-2

⁰pin yin ¹shu ru fa|de gong neng
1.拼音输入法  2.拼音输入  3.拼音  4.品  5.拼

FIG. 10

When pressing CTRL

⁰pin yin ¹shu ru fa ²de ³gong neng|
1.拼音输入法的功能  2.拼音输入法  3.拼音输入  4.拼音  5.品

FIG. 11

INPUT METHOD EDITOR

BACKGROUND

This specification relates to input methods.

A writing system uses symbols (e.g., characters or graphemes) to represent sounds of a language. A collection of symbols in a writing system can be referred to as a script. For example, a Latin writing system, including a collection of Roman characters in one or more Roman scripts, can be used to represent the English language. The Latin writing system can include blocked Roman characters (e.g., capitalized character "B"), typed Roman characters (e.g., plain character "b"), and cursive Roman characters (e.g., cursive character "b"). Each visual representation of the character "b" represents the same grapheme in the Latin writing system.

As another example, the Chinese language can be represented by more than one writing system. For example, the Chinese language can be represented by a first writing system, e.g., Pinyin (or Romanized Chinese). As another example, the Chinese language can be represented using a second writing system, e.g., Bopomofo or Zhuyin Fuhao ("Zhuyin"). As yet another example, the Chinese language can be represented using a third writing system, e.g., Hanzi. In particular, Pinyin and Zhuyin are phonetic systems for representing Hanzi characters.

Languages that use logographic writing systems in which one or more symbols, e.g., characters, correspond roughly to one word or meaning have more characters than keys on a standard input device, such as a computer keyboard on a mobile device keypad. An input method editor, however, facilitates the use of computer keyboards to input characters in these writing systems. For example, an input method editor can take Roman character inputs in the Pinyin writing system and map the inputs to the many Hanzi characters of the Chinese language. Accordingly, a keyboard designed for input in a first writing system can be used to input text in a second writing system, e.g., a keyboard for Roman scripts (e.g., a QWERTY keyboard) can be used to input Chinese, Japanese, or Korean characters.

SUMMARY

In general, one aspect of the subject matter described in this specification can be embodied in methods that include the actions of receiving an input sequence of characters in a first writing system; identifying in the input sequence of characters one or more first subsequences of consecutive characters, where each subsequence represents a syllable in a different, second writing system; identifying in the input sequence of characters one or more second subsequences, where each second subsequence includes one or more consecutive first subsequences and represents a term in the different, second writing system; determining one or more boundaries that delimit the one or more second subsequences; and generating one or more selectable indicators for display in a user interface, where each of the one or more selectable indicators identifies a respective second subsequence delimited by the one or more boundaries. Other embodiments of this aspect include corresponding systems, apparatus, and computer program products.

These and other embodiments can optionally include one or more of the following features. The method further includes determining, from the entire input sequence of characters, one or more first input candidates in a third writing system, where the third writing system is different from the first writing system and from the second writing system, and where each first input candidate corresponds to a sequence of one or more consecutive second subsequences; and displaying the one or more first input candidates as selectable alternatives to the input sequence of characters.

The method further includes detecting a trigger event; and displaying, in the user interface, the selectable indicators in response to detecting the trigger event, where each selectable indicator identifies a respective second subsequence. The method further includes receiving a user selection of a first selectable indicator; and determining, from a third subsequence of characters, one or more second input candidates in the third writing system, where the third subsequence includes all the second subsequences in the order in which they occur in the input sequence up to the particular second subsequence identified by the first selectable indicator. The method further includes displaying the one or more second input candidates as selectable alternatives to the third subsequence of characters instead of the first input candidates.

The method further includes receiving a user input to move a text cursor to a particular first subsequence, where the text cursor identifies a current position for text entry; and determining, from a third subsequence of characters, one or more second input candidates in the third writing system, where the third subsequence includes all the complete second subsequences in the order in which they occur in the input sequence up to the particular first subsequence, followed by all the first subsequences in the order in which they occur in the input sequence up to and including the particular first subsequence. The method further includes displaying the one or more second input candidates as selectable alternatives to the third subsequence of characters instead of the first input candidates. The first writing system is Latin, the different, second writing system is Pinyin, and the third writing system is Hanzi.

Another aspect of the subject matter described in this specification can be embodied in methods that include the actions of separating a plurality of characters inputted by a user into one or more tokens, where a token is a group of one or more characters; grouping the tokens into one or more token groups; generating one or more boundaries for the token groups according to an operation granularity; and in response to receiving an input indicating an activation of a trigger, visually indicating the boundaries for the token groups. Other embodiments of this aspect include corresponding systems, apparatus, and computer program products.

These and other embodiments can optionally include one or more of the following features. The operation granularity is selected from a group of granularities including: a character level, where operations are performed on individual characters; a token level, where operations are performed on tokens, and where a token represents a syllable; and a token group level, where operations are performed on token groups, and where a token group represents a phrase.

The method further includes moving a caret one token group left or one token group right by pressing one or more hot keys, where the caret identifies a current position of text entry. The trigger is activated by one or more hot keys pressed by the user. When the one or more hot keys are pressed continuously, the one or more boundaries for the token groups are visually indicated using numbers.

The one or more boundaries for the token groups are generated using a language model. Each token group corresponds to a language model lattice item in the language model, where the language model lattice item is a lexical item, or a phrase. The method further includes selecting a token group in response to receiving an input selecting a boundary for the token group. The input selecting the boundary is generated by a hot key composed of a control key and a number that corresponds to the visual indicator for the boundary.

Particular embodiments of the subject matter described in this specification can be implemented so as to realize one or more of the following advantages. Automatically identifying selectable sequences of text, e.g., sequences of text that represent terms, in a user input reduces how much user interaction is required to modify the user input and obtain a selectable alternative to the input (e.g., a transliteration of the input). Automatically identifying selectable sequences of text saves users time when browsing through and editing groups of inputted characters, because the number of navigational inputs (e.g., inputs to move a text cursor) or editing inputs (e.g., inputs to delete/add characters) can be reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6-18 are screenshots illustrating example input method editor interfaces and interactions for browsing and editing the input.

DETAILED DESCRIPTION

Figure 1A:
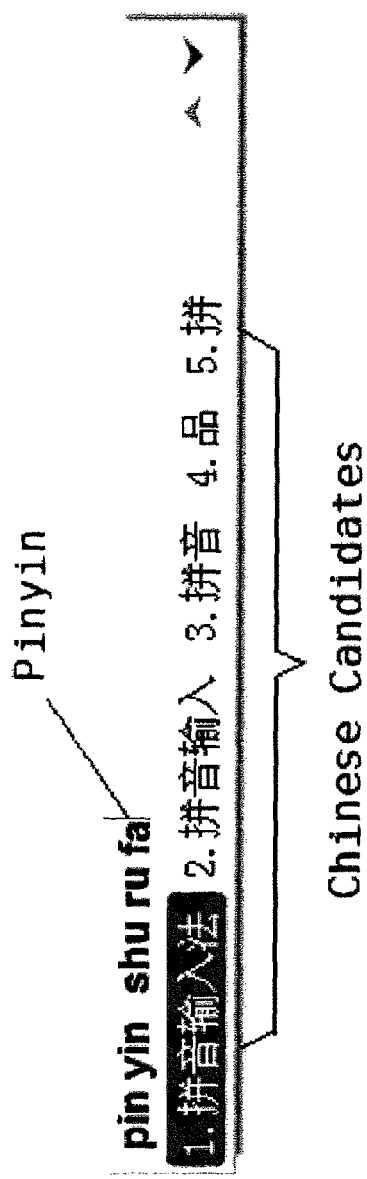
FIG. 1A is a screenshot illustrating an example input method editor interface displaying an input and selectable alternatives to the input.

FIG. 1A is a screenshot illustrating an example input method editor (IME) interface displaying an input and selectable alternatives to the input. An IME interface can include a first interface element (e.g., a composing box) for providing input in a first writing system (e.g., Pinyin), and a second interface element (e.g., a candidate window) for displaying selectable alternatives in a different, second writing system (e.g., candidate transliterations in Hanzi-Chinese). In FIG. 1A, the input is "pin yin shu ru fa", and the five selectable alternatives are the five candidate transliterations in Hanzi-Chinese, i.e., "拼音输入法" (e.g., "pīn yīn shū rù fǎ" in Pinyin); "拼音输入" (e.g., "pīn yīn shū rù" in Pinyin); "拼音" (e.g., "pīn yīn" in Pinyin); "品" (e.g., "pǐn" in Pinyin); and "拼" (e.g., "pīn" in Pinyin).

In general, the input can include a sequence of one or more characters. As an example, the input can be a character, a term containing multiple characters (e.g., a word, or a phrase), or a sentence containing multiple terms. Sometimes, the input can be a complete phonetic spelling of a desired transliteration. In FIG. 1A, for example, the input "pin yin shu ru fa" may be a complete phonetic spelling of "拼音输入法". In some situations, it may be inconvenient for a user to enter the full Pinyin representation (complete phonetic spelling), e.g., especially on a mobile device (e.g., a mobile phone). Therefore, a user may sometimes input a number of characters that are less than the full Pinyin representation (e.g., an abbreviation). For example, a user can provide as input "p y s r f", and an IME may map the input "p y s r f" to the full Pinyin representation "pin yin shu ru fa".

In both examples, it may be inconvenient for a user to modify the input, e.g., when the input includes typographical errors. In an IME or user interface like that of FIG. 1A, the user would need to move a text cursor (e.g., a caret or I bar) to the location of the typographical error, e.g., by pressing a LEFT/RIGHT cursor key one time for each selectable object (e.g., each selectable alternative, or each delimited group of Roman characters) that separates the current location of the text cursor from the location of the typographical error. A text cursor identifies a current location for text entry or modification.

Figure 1B:
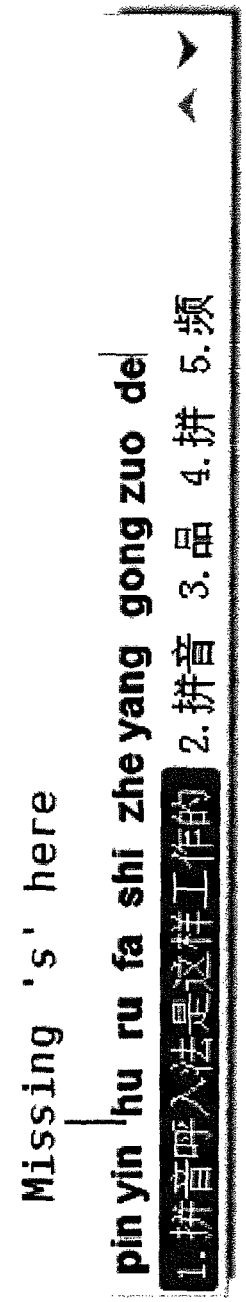
FIG. 1B is a screenshot illustrating an example input method editor interface displaying an input with a typographical error and selectable alternatives to the input.

FIG. 1B is a screenshot illustrating an example input method editor interface displaying an input with a typographical error and selectable alternatives to the input. In FIG. 1B, a user intended to provide an input "Pin yin shu ru fa shi zhe yang gong zuo de" (emphasis added). The user, however, did not enter the character "s" in the intended sequence of characters "shu" (e.g., a Pinyin syllable). Therefore, the input currently includes the sequence of characters "Pin yin hu ru fa shi zhe yang gong zuo de" (emphasis added). Accordingly, the selectable alternatives (e.g., transliteration candidates in Chinese) may differ from what the user intended to obtain.

In FIG. 1B, note that the text cursor is currently located on the selectable alternative "拼音呼入法是这样工作的", as shown by the highlighting of the first selectable alternative. To correct the typographic error, a user would press a LEFT cursor key nine times (e.g., to pass through (1) "de", (2) "zuo", (3), "gong", (4) "yang", (5) "zhe", (6) "shi", (7) "fa", (8) "ru", and (9) "hu"), or a RIGHT cursor key seven times (e.g., to pass through (1) "拼音", (2) "品", (3) "拼", (4) "频", (5) "pin", (6) "yin", and (7) "hu"), to move the text cursor to "hu" and insert the missing character "s".

Figure 2:
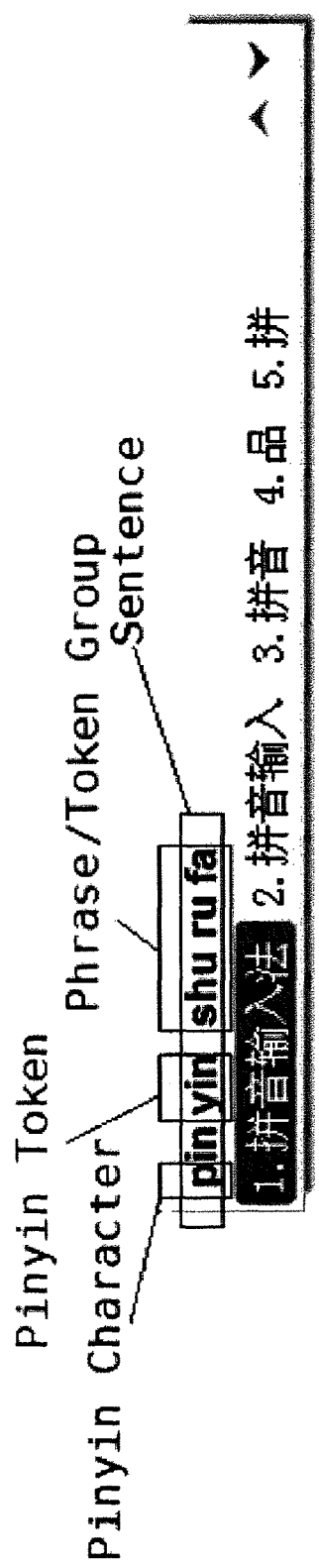
FIG. 2 is a screenshot illustrating the example input method editor interface of FIG. 1A with different portions of the input labeled.

FIG. 2 is a screenshot illustrating the example input method editor interface of FIG. 1A with different portions of the input labeled. The different portions correspond to different linguistic units, e.g., a unit for a character, a unit for a syllable, a unit for a term (e.g., one or more words), and a unit for a sentence. Each linguistic unit corresponds to an operational unit under an operation granularity, e.g., a level where browsing and editing operations (e.g., highlighting, deleting, copying, pasting, replacing) can be performed on the unit as a whole.

In general, operation granularity levels include a character level, a token level, a term level, and a sentence level. On the character level, operations can be performed on characters in a first writing system of the original input. On the token level, operations can be performed on tokens (e.g., syllables) represented by the characters in the first writing system. On the token group level, operations can be performed on token groups (e.g., terms or phrases). The sentence level views an entire input, e.g., which may or may not be a sentence, as an operational unit.

In FIG. 2, the Pinyin input is labeled according to example operation granularity levels for the Pinyin writing system. In particular, the character level is labeled as a "Pinyin character" level, where operations are performed on individual Latin characters. The token level is labeled as a "Pinyin token" level, where operations are performed on Pinyin tokens, e.g., a Pinyin syllable or abbreviation for a Pinyin syllable, the smallest transliteration unit corresponding to a Chinese character. The token group level is labeled as a "Phrase/token Group" level, where operations are performed on token groups, e.g., Pinyin terms or phrases. The sentence level is labeled as a "Sentence" level. Note that the level labels in FIG. 2 are not actually displayed in the illustrated IME interface.

In FIG. 2, the input "pin yin shu ru fa" includes five Pinyin tokens: "pin", "yin", "shu", "ru" and "fa", which each can represent a Pinyin syllable for a Chinese character. As another example, an input "p y shu r fa" also represents five Pinyin syllables, where "p", "y", "r" are abbreviations for Pinyin syllables. Various combinations of the one or more five Pinyin tokens can be Pinyin token groups, which correspond to Hanzi-Chinese terms.

Figure 3:
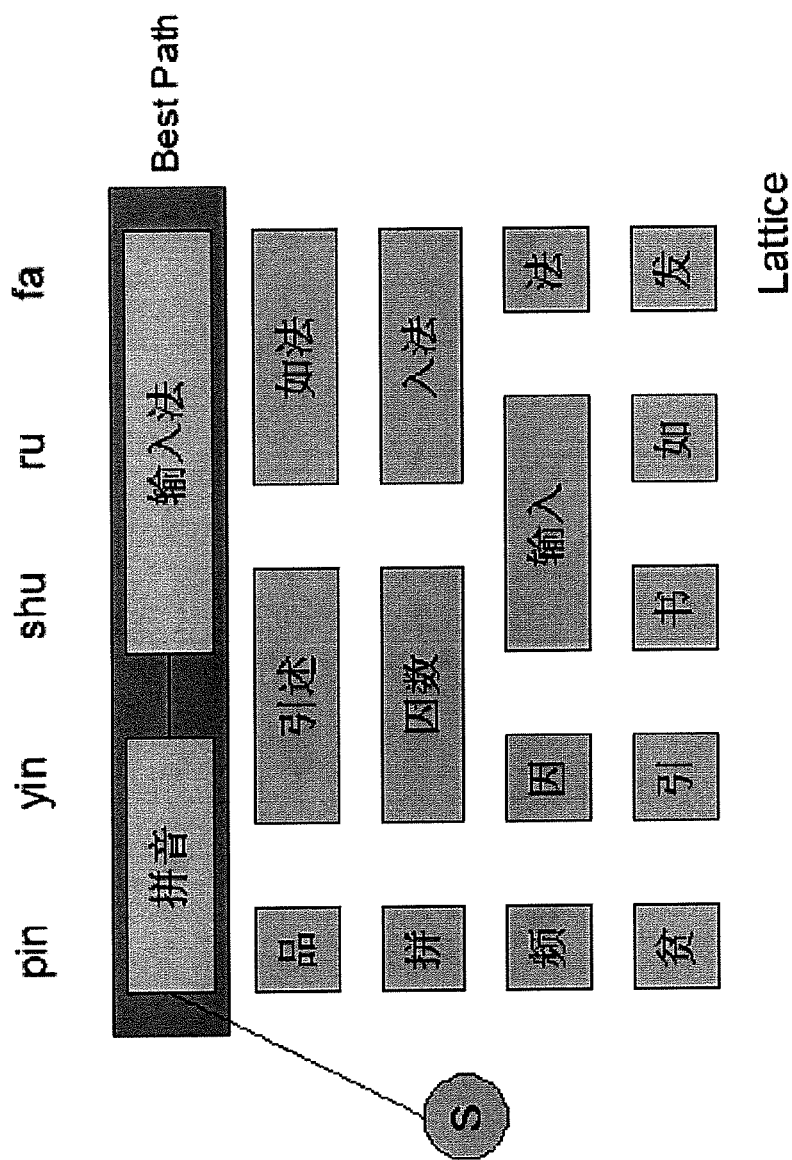
FIG. 3 is a block diagram illustrating an observed sequence of text input and potential sequences of terms that are represented by the observed sequence of text input.

FIG. 3 is a block diagram illustrating an observed sequence of text input and potential sequences of terms that are represented by the observed sequence of text input. The data illustrated in FIG. 3 can be stored in a lattice in a language model. The language model can be used to generate candidate transliterations for the observed sequence of text, e.g., the sequence of text "pin yin shu ru fa" in FIG. 3, as described further with respect to FIG. 21. In the lattice of FIG. 3, the most probable candidate transliterations can be selected by traversing different paths through the lattice items. In particular, some example candidate transliterations include "拼音输入法", "拼因数入法", "频因输入法", and "贫引书如发". In the example, the best path, i.e., the most probable candidate transliteration, is "'拼音输入法'". Segmentations of the input into subsequences of characters, that represent terms in the target writing system, can be provided by the language model. Conventional methods can be used to generate and use the language model.

Figure 4:
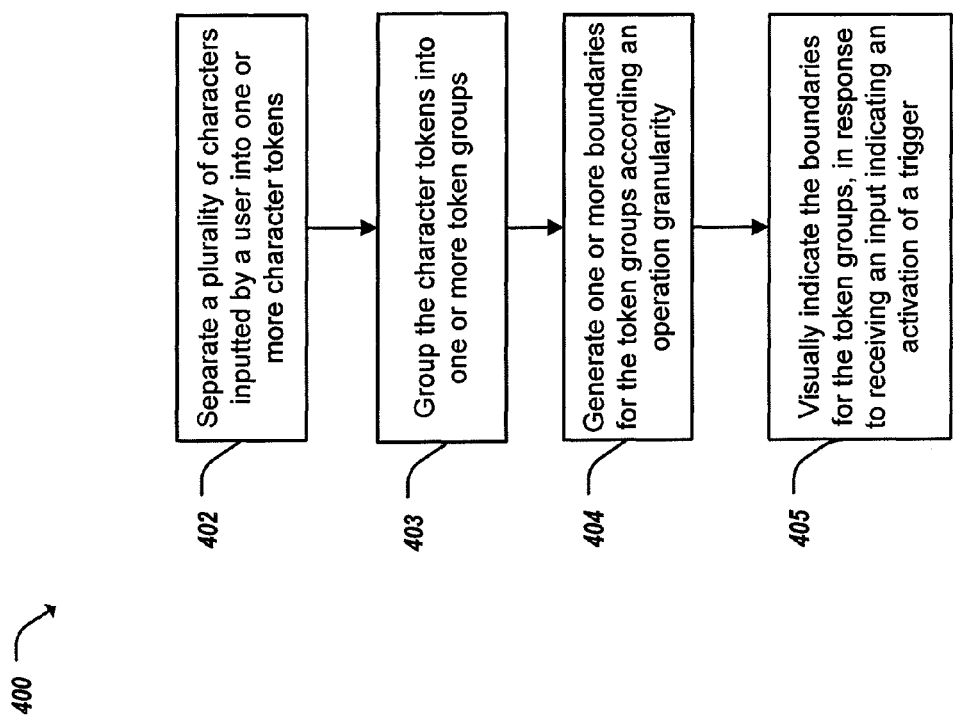
FIG. 4 is a flow chart showing an example process for providing browsing and editing functionality in an input method editor.

FIG. 4 is a flow chart showing an example process 400 for providing browsing and editing functionality in an input method editor. The process 400 includes separating 402 a plurality of characters inputted by a user into one or more tokens. A token is a group of one or more characters. As an example, when a user provides an input "pinyinshurufa", the characters in the input are separated into five tokens "pin", "yin", "shu", "ru", and "fa", as shown in FIG. 2. The process 400 also includes grouping 403 the tokens into one or more token groups. In the example, the five character tokens "pin", "yin", "shu", "ru", and "fa" can be grouped into two token groups (also referred to as "phrase token") "pinyin" and "shurufa".

The process 400 also includes generating 404 one or more boundaries for the token groups according to an operation granularity. In some implementations, the one or more boundaries are generated by using a language model to identify a most probable transliteration candidate, e.g., a transliteration candidate represented by a most probable path through a lattice of the language model. In the example, a boundary that delimits the token groups "pinyin" and "shurufa" can be identified. Furthermore, a boundary that delimits the tokens "pin" and "yin", and boundaries that delimits the tokens "shu", "ru", and "fa", can be identified.

The process 400 also includes visually indicating 406 the boundaries for the token groups, in response to receiving an input indicating an activation of a trigger. Visually indicating a boundary can include labeling the token groups delimited by the boundaries, e.g., displaying numbers or letters next to each token group. The boundaries can also be visually indicated using different colors, patterns, or other visual aspects to distinguish the token groups.

A user can use the visual indicators to quickly recognize the token groups and to navigate directly to a particular token group, e.g., without moving a text cursor through token groups between the particular token group and a current location of the text cursor, during browsing and editing of the input.

Figure 5:
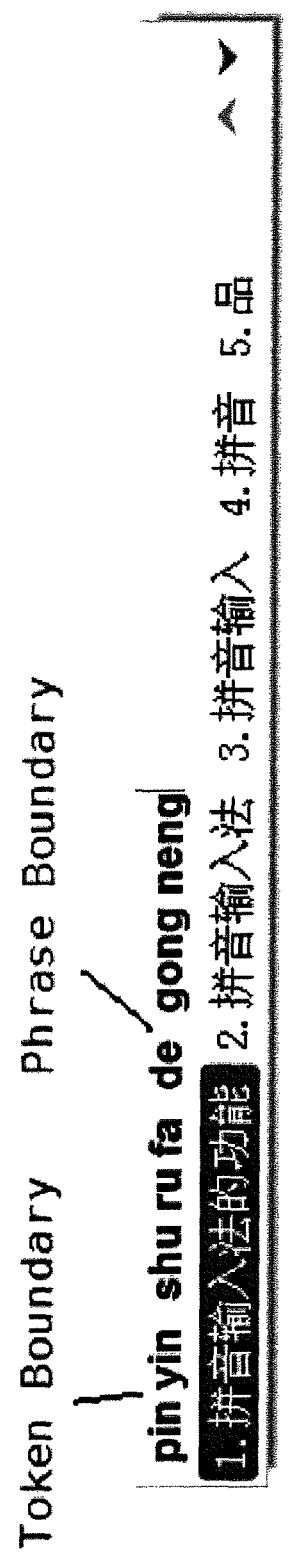
FIG. 5 is a screenshot illustrating an example input method editor interface displaying an input with different portions of the input labeled.

FIG. 5 is a screenshot illustrating an example input method editor interface displaying an input with different portions of the input labeled. In FIG. 5, the input "pinyinshurufadegongneng" is a sequence of Roman characters that are used to represent Pinyin. Note that a user does not typically enter delimiters (e.g., a space, a "|" character) to explicitly delimit boundaries between the Roman characters.

The IME interface in FIG. 5 shows a version of the input after the input Pinyin "pinyinshurufadegongneng" is separated into eight Pinyin tokens "pin", "yin", "shu", "ru", "fa", "de", "gong" and "neng". Boundaries that delimit each of the eight Pinyin tokens from an adjacent Pinyin token, e.g., token boundaries, are identified. Furthermore, the IME can identify four token groups "pinyin", "shurufa", "de" and "gongneng" from the eight Pinyin tokens. Boundaries that delimit each of the four token groups from an adjacent Pinyin token, e.g., token group boundaries, are identified. The boundaries can be determined from segmentations identified by using a language model.

FIGS. 6-18 are screenshots illustrating example input method editor interfaces and interactions for browsing and editing the input. In particular, FIGS. 6-14 show browsing operations, e.g., operations performed to move a text cursor directly from one operational unit to another operational unit. FIGS. 15-18 show editing operations, e.g., operations performed on an operational unit, as a whole, to modify the operational unit.

Figure 6:
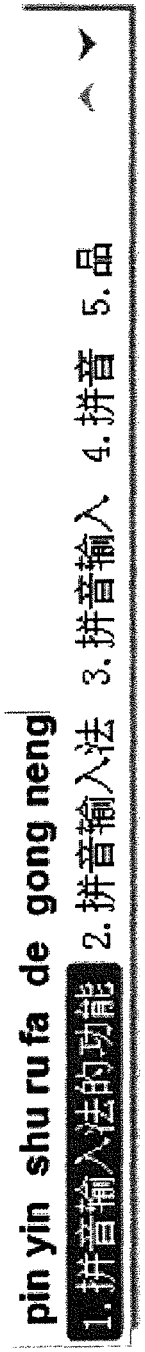

FIG. 6 shows the example IME interface before a trigger event is detected. As an example, the trigger event can be the receipt of a command input from a user indicating that the user intends to activate functionality to browse through or edit operational units of the input. As an example, the command input can be an activation of a hot key, e.g., by pressing a Control ("CTRL") key. The command input can also be an activation of one or more physical keys, e.g., keys on a physical keyboard device, or virtual keys, e.g., visual representations of a key on a display.

Figure 7:
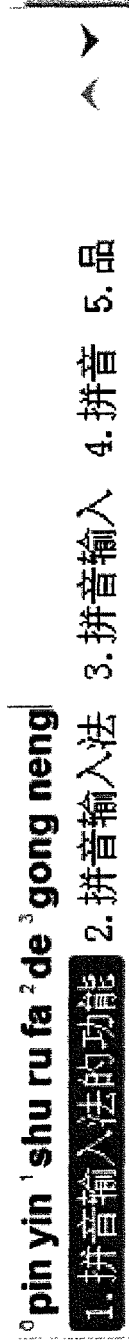
Figure 12:
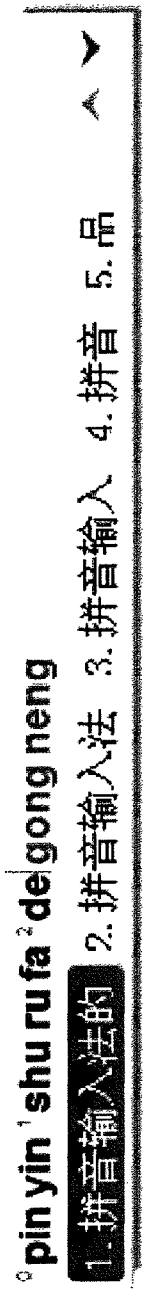

When the CTRL key is pressed, visual indicators that distinguish the token groups "pinyin", "shurufa", "de" and "gongneng" are displayed in the IME interface. In FIG. 7, the token group "pinyin" is labeled with the number "0", the token group "shurufa" is labeled with the number "1", the token group "de" is labeled with the number "2", and the token group "gongneng" is labeled with the number "3".

The visual indicators can be removed from display when the trigger event ends. As an example, the trigger event can continue during the time that the CTRL key is pressed and end when the CTRL key is released. As another example, the trigger event can start when the CTRL key is pressed once and end when the CTRL key is pressed again. In FIG. 8, the trigger event has ended and the IME interface returns to the state as in FIG. 6, e.g., where the labels "0", "1", "2" and "3" disappear.

The IME interface in FIG. 9 shows the same state as in FIG. 6, when the labels are displayed in response to the trigger event. Note that a text cursor, e.g., a caret, is currently located to the right of token group "gongneng" in the user interface. A particular token group can be selected by providing command input, and the text cursor can simultaneously be moved to a location adjacent to the particular token group, e.g., a location between the particular token group and an adjacent token group that occurs in the input before or after the particular token group.

In FIG. 10, when the CTRL key and a number key are pressed simultaneously (CTRL+number) the text cursor is moved to a token group boundary labeled by the corresponding number. As illustrated in FIG. 10, when the CTRL key and number "2" key are pressed at the same time, the text cursor is moved to the token group boundary labeled by "2", e.g., a location immediately to the left of the token group "de". As illustrated in FIG. 10, in some implementations, the visual indicators associated with token groups, that occur in the input after the selected, particular token group, are removed from display. In FIG. 10, the labels "2" and "3" have been removed from display.

In some implementations where the IME interface is displayed on a touchscreen display, a visual indicator can be selected by touching the graphical representation of the visual indicator on the touchscreen display.

In some implementations, visual attributes (e.g., color, size) of the token groups, that occur in the input after the selected particular token group, are modified to indicate that these token groups are temporarily removed from consideration for determining selectable alternatives. The removal is considered to be temporary because these token groups can be added back into consideration as part of the input when the trigger event ends. When the trigger event ends, the user is more likely to have completed editing portions of the input that occur before these token groups.

In FIG. 10, the font color of the token groups "de" and "gong neng" has been modified, e.g., changed to a lighter color, to indicate that "de gong neng" is not being considered in the current state of the IME interface. Accordingly, the IME determines and provides for display selectable alternatives for the portion of the input that does not include "gong neng". Note that, in FIG. 9, the first selectable alternative "拼音输入法的公能" (e.g., "pīn yīn shū rù fǎ de gōng néng" in Pinyin) for the input "pin yin shu ru fa de gong neng" is not the same as the first selectable alternative "拼音输入法" (e.g., "pīn yīn shū rù fǎ") for the portion of the input being considered in FIG. 10, i.e., "pin yin shu ru fa".

In FIG. 11, the state of the IME user interface is the same as in FIG. 9. Again, note that the text cursor is located to the right of token group "gongneng" in the user interface. In some implementations, the text cursor is directly moved from one token group boundary to another token group boundary by providing a directional input. For example, in FIG. 12, when the CTRL key and LEFT key (e.g., "←" cursor key) are pressed at the same time, the text cursor is moved from the location shown in FIG. 11 to the location shown in FIG. 12, i.e., the location of the first token group boundary to the left of the original location of the text cursor.

Figure 13:
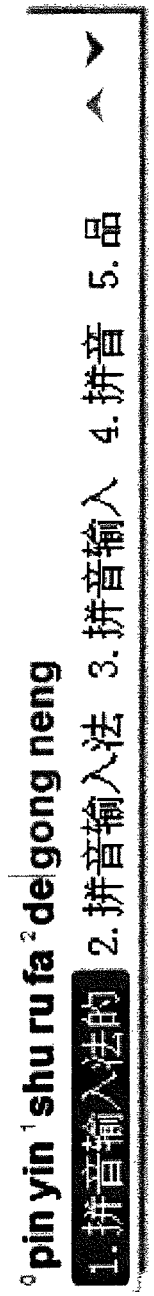
Figure 14:
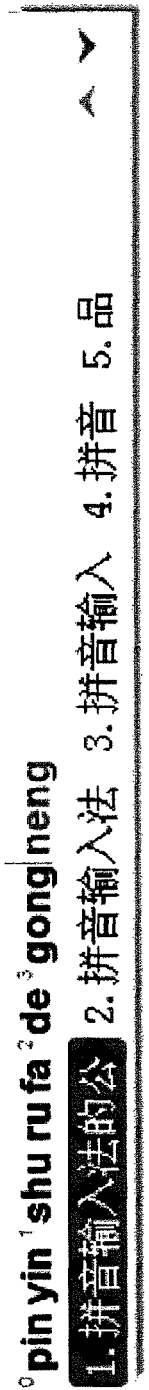

Similarly, FIGS. 13-14 show how a direction input can be used to move the cursor directly from one token boundary to another token boundary. In the example, CTRL+RIGHT (e.g., CTRL+←) moves the text cursor to the location of a first token group to the right of the original location of the text cursor, i.e., from a location immediately to the right of the token "de" to a location immediately to the right of the token "gong". Other browsing operations (e.g., moving the text cursor in other directions (e.g., up, down)) are possible.

Figure 15:
Figure 16:
Figure 18:
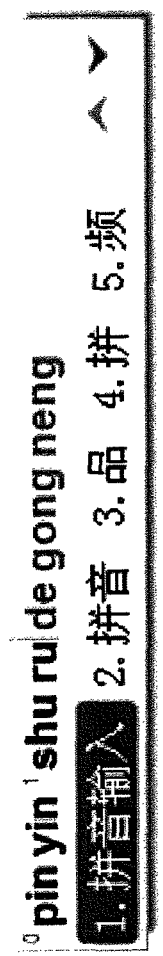

In FIGS. 15-16, an editing operation, e.g., a backspace operation, is performed on a token. Note that, in FIG. 15, the text cursor is located to the right of token "fa" in the user interface. In FIG. 18, when the CTRL key and BACKSPACE key are pressed at the same time, the token located immediately to the left of the text cursor, i.e., "fa", is deleted.

Figure 17:
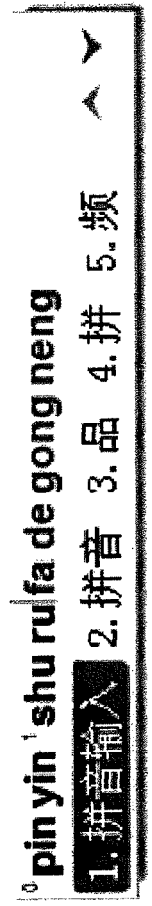

In FIGS. 17-18, an editing operation, e.g., a delete operation, is performed on a token. Note that, in FIG. 17, the text cursor is located immediately to the left of the token "fa" in the user interface. In FIG. 18, when the CTRL key and DELETE key ("DEL" key) are pressed at the same time, the token located immediately to the right of the text cursor, i.e., "fa", is deleted. Other editing operations (e.g., copying, pasting, replacing) are possible.

The description above describes particular implementations. Additional descriptions of general features for these and other implementations follow.

In some implementations, an input sequence of characters in a first writing system is received. For example, the first writing system can be Latin. In FIG. 5, an example of the input sequence of characters is "pinyinshurufadegongneng".

One or more first subsequences of consecutive characters, in the input sequence of characters, are identified. Each subsequence represents a syllable in a different, second writing system. The different, second writing system can be Chinese Pinyin, where a syllable corresponds to a Hanzi character. In FIG. 5, examples of first subsequences are "pin", "yin", "shu", "ru", "fa", "de", "gong" and "neng".

One or more second subsequences in the input sequence of characters are identified. Each second subsequence includes one or more consecutive first subsequences and represents a term in the different, second writing system. In FIG. 5, example second subsequences include "pinyin" (including the consecutive first subsequences "pin" and "yin"), "shurufa" (including the consecutive first subsequences "shu", "ru", and "fa"), "de", and "gongneng" (including the consecutive first subsequences "gong" and "neng").

One or more boundaries that delimit the one or more second subsequences are determined. In FIG. 5, an example of the a boundary for the second subsequences is the token group boundary between "pinyin" and "shurufa".

One or more selectable indicators are generated for display in a user interface. Each of the one or more selectable indicators identifies a respective second subsequence delimited by the one or more boundaries. In FIG. 7, example selectable indicators include the labels "0", "1", "2" and "3" that identify the four second subsequences "pinyin", "shurufa", "de", and "gongneng".

In some implementations, one or more first input candidates in a third writing system are determined from the entire input sequence of characters, and the one or more first input candidates are displayed as selectable alternatives to the input sequence of characters. For example, the third writing system can be Hanzi, Katakana, or Hangul. In FIG. 5, example first input candidates "拼音输入法的功能", "'拼音输入法'", "拼音输入", "拼音" and "品" are generated and displayed on the user interface for "pinyinshurufade-gongneng".

In some implementations, when a user selection of a first selectable indicator is received, one or more second input candidates in the third writing system are determined from a third subsequence of characters. The third subsequence includes all the second subsequences in the order in which they occur in the input sequence up to the particular second subsequence identified by the first selectable indicator. As an example, in FIG. 10, when a user selects the first selectable indicator "2", a second input candidate "'拼音输入法'" is determined from the third subsequence "pinyin shurufa", which includes the second subsequences "pin yin" and "shurufa".

The one or more second input candidates are displayed as selectable alternatives to the third subsequence of characters instead of the first input candidates. As an example, in FIG. 10, the second input candidate "'拼音输入法'" is determined from "pin yin shu ru fa" and displayed as a selectable alternative to the third subsequence of characters instead of the first input candidate "拼音输入法的功能" for "pin yin shu ru fa de gong neng" as shown in FIG. 9.

In some implementations, after a user input to move a text cursor to a particular first subsequence is received, one or more second input candidates in the third writing system are determined from a third subsequence of characters. The third subsequence includes all the complete second subsequences in the order in which they occur in the input sequence up to the particular first subsequence, followed by all the first subsequences in the order in which they occur in the input sequence up to and including the particular first subsequence. In FIG. 14, a second input candidate "拼音输入法的" is determined from "pinyin shurufa de gong" when the user moves the text cursor to "neng".

The one or more second input candidates are displayed as selectable alternatives to the third subsequence of characters instead of the first input candidates. As an example, in FIG. 12, the second input candidate "拼音输入法的" for "pin yin shu ru fa de" is displayed as a selectable alternatives to the third subsequence of characters instead of the first input candidates "拼音输入法的功能" for "pin yin shu ru fa de gong neng".

Figure 19:
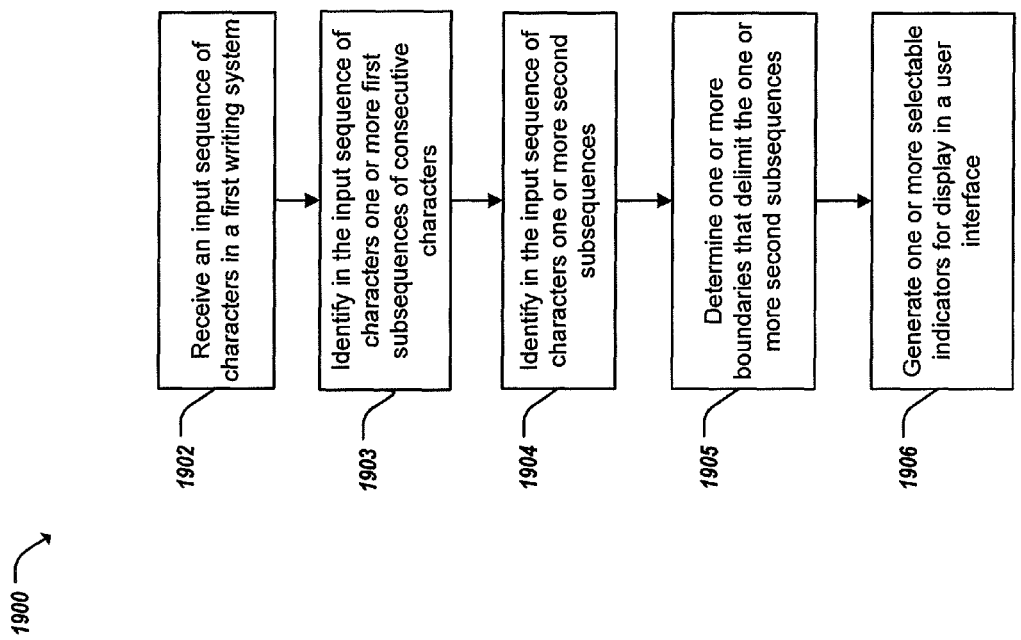
FIG. 19 is a flow chart showing another example process for providing browsing and editing functionality in an input method editor.

FIG. 19 is a flow chart showing another example process 1900 for providing browsing and editing functionality in an input method editor. The process 1900 includes receiving 1902 an input sequence of characters in a first writing system. The process 1900 also includes identifying 1903 in the input sequence of characters one or more first subsequences of consecutive characters. Each subsequence represents a syllable in a different, second writing system. The process 1900 also includes identifying 1904 in the input sequence of characters one or more second subsequences. Each second subsequence includes one or more consecutive first subsequences and represents a term in the different, second writing system.

The process 1900 also includes determining 1905 one or more boundaries that delimit the one or more second subsequences. The process 1900 also includes generating 1906 one or more selectable indicators for display in a user interface. Each of the one or more selectable indicators identifies a respective second subsequence delimited by the one or more boundaries.

Figure 20:
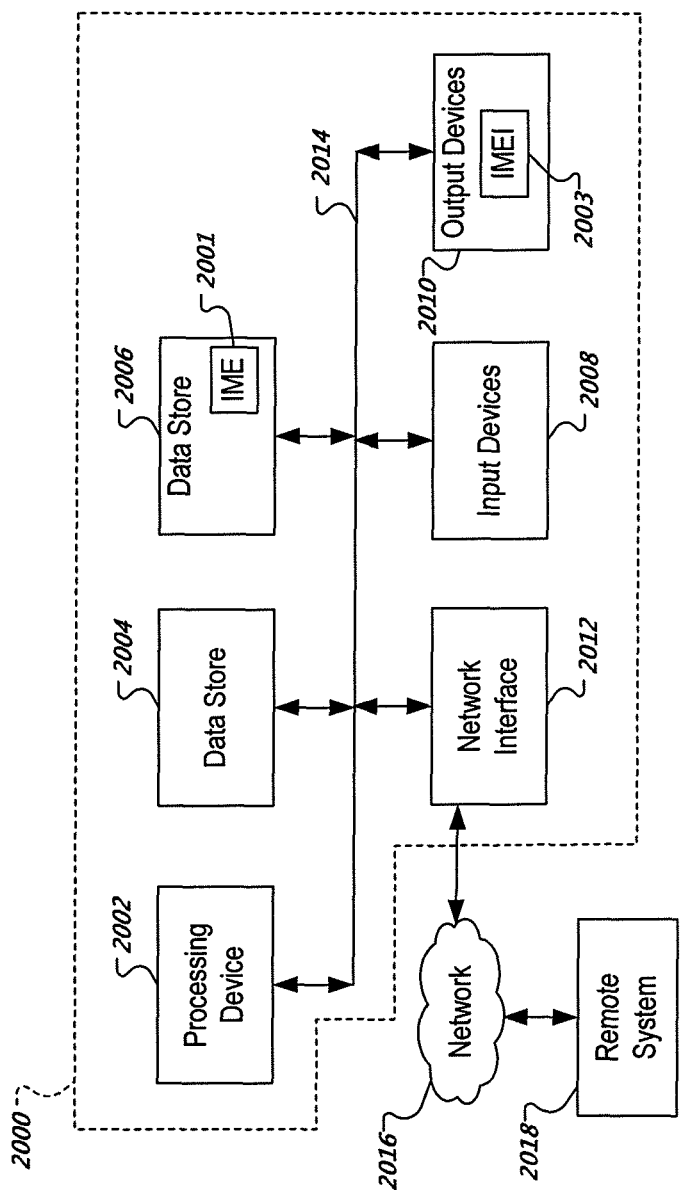
FIG. 20 is a block diagram of an example system that can be utilized to implement the systems and methods described herein.

FIG. 20 is a block diagram of an example system 2000 that can be utilized to implement the systems and methods described herein. The example system 2000 can, for example, be implemented in a computer device, e.g., a personal computer device, or other electronic devices, e.g., a mobile phone, mobile communication device, personal digital assistant (PDA), Global Positioning System (GPS) navigation device, and the like.

The example system 2000 includes a processing device 2002, a first data store 2004, a second data store 2006, input devices 2008, output devices 2010, and a network interface 2012. A bus system 2014, including, for example, a data bus and a motherboard, can be used to establish and control data communication between the components 2002, 2004, 2006, 2008, 2010 and 2012. Other system architectures can also be used.

The processing device 2002 can, for example, include one or more microprocessors. The first data store 2004 can, for example, include a random access memory storage device, such as a dynamic random access memory, or other types of computer readable medium memory devices. The second data store 2006 can, for example, include one or more hard drives, a flash memory, and/or a read only memory, or other types of computer readable medium memory devices.

Example input devices 2008 can include a keyboard, a mouse, a stylus, etc., and example output devices 2010 can include a display device, an audio device, etc. The network interface 2012 can, for example, include a wired or wireless network device operable to communicate data to and from a network 2016. The network 2016 can include one or more local area networks (LANs), a wide area network (WAN), such as the Internet, a wireless network, such as a cellular network, or a combination of all of the above.

In some implementations, the system 2000 can include input method editor (IME) code 2001 from a data store, such as the data store 2006. The input method editor code 2001 can be include instructions that upon execution cause the processing device 2002 to carry out input method editing functions. The input method editor code 2001 can, for example, comprise interpreted instructions, such as script instructions, e.g., JavaScript or ECMAScript instructions, that can be executed in a web browser environment. Other implementations can also be used, e.g., a stand-alone application, an applet, a plug-in module, etc., for use in a user interface, e.g., one that displays user inputs received by use of keypad mapping for a mobile device or keyboard mapping for a mobile device or personal computer.

Execution of the input method editor code 2001 generates or launches an input method editor instance (IMEI) 2003. The input method editor instance 2003 facilitates the processing of one or more input methods at the system 2000, during which time the system 2000 can receive inputs for characters or symbols, such as, for example, Roman characters that represent Pinyin. For example, the user can use one or more of the input devices 2008 (e.g., a keyboard, such as a keyboard for Roman scripts, a stylus used with a handwriting recognition engine, etc.) to input Pinyin inputs for identification of Hanzi terms. In some cases, a Hanzi term will be composed of more than one Pinyin input.

The first data store 2004 and/or the second data store 2006 can store an association of inputs. Based on a user input, the input method editor instance 2003 can use information in the data store 2004 and/or the data store 2006 to identify one or more candidate selections represented by the input. In some implementations, if more than one candidate selection is identified, the candidate selections are displayed on an output device 2010. Using the input device 2008, the user can select from the candidate selections a Hanzi term, for example, that the user desires to input.

In some implementations, the input method editor instance 2003 on the system 2000 can receive one or more Pinyin inputs and convert the inputs into Hanzi terms. The input method editor instance 2003 can, for example, use compositions of Pinyin syllables (e.g., Roman characters) received from keystrokes to represent the Hanzi terms. Each Roman character can, for example, correspond to a key in the keyboard for Roman scripts. Using a Pinyin input method editor, a user can input a Hanzi term by using inputs that include one or more Pinyin syllables representing the sound of the Hanzi term. Input methods for other languages and writing systems, however, can also be facilitated.

In some implementations, a remote computing system 2018 having access to the system 2000 can also be used to edit a logographic script. For example, the system 2000 may be a server that provides logographic script editing capability via the network 2016. In one example, a user can edit a logographic script stored in the data store 2004 and/or the data store 2006 using a remote computing system, e.g., a client computer. The system 2000 can, for example, select a character and receive an input from a user over the network interface 2012. The processing device 2002 can, for example, identify one or more characters adjacent to the selected character, and identify one or more candidate selections based on the received input and the adjacent characters. The system 2000 can transmit a data communication that includes the candidate selections back to the remote computing system.

Figure 21:
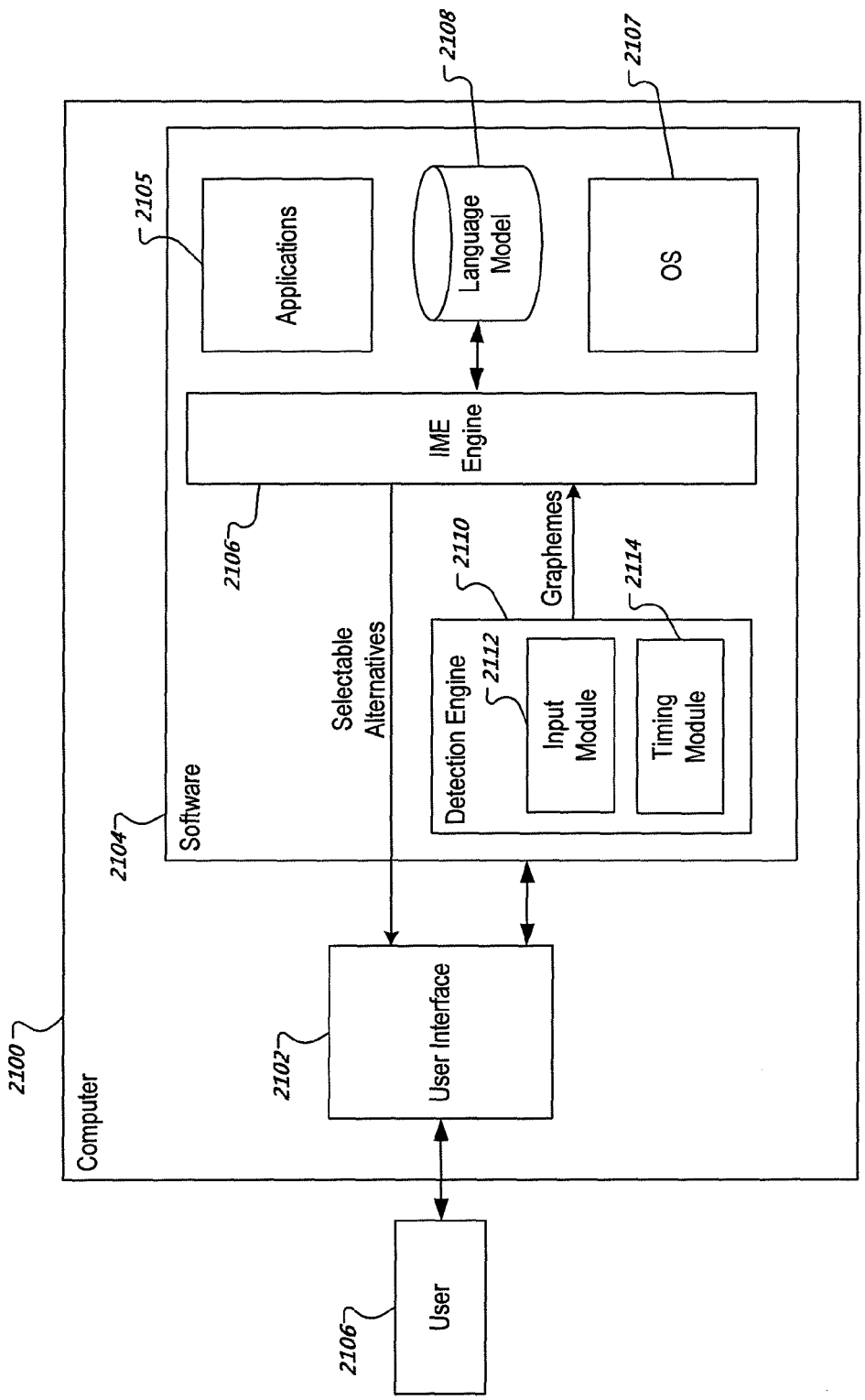
FIG. 21 includes a block diagram of example software that can be utilized to implement an input method editor in FIG. 20.

FIG. 21 includes a block diagram of example software that can be utilized to implement an input method editor in FIG. 20 (e.g., IMEI 2003). The system 2100 includes a user interface 2102 and software 2104. A user 2106 can access system 2100 through the user interface 2102. The software 2104 includes applications 2105, IME engine 2106, an operating system (OS) 2107, a language model 2108, and a detection engine 2110. The operating system 2107 is a particular piece of software that can provide the user interface 2102 between the software 2104 (e.g., applications 2105 and IME engine 2106) and the user 2106.

As shown in FIG. 21, the language model 2108 is separate from IME engine 2106. In particular, the language model 2108 is included within software 2104 as a separate software component. Other implementations are possible. For example, the language model 2108 can be located remotely (e.g., at the remote system 118 of FIG. 1). As another example, the language model 2108 can be included within the IME engine 2106.

The language model 2108 can define one or more language sub-models, e.g., a Japanese language sub-model, a Chinese language sub-model, etc. Each language sub-model can, for example, define a particular rule set, e.g., grammar particular to a language, phrase sets, verbals, etc., that can be used to determine a user's likely intent in entering a set of inputs (e.g., inputs for generating candidates that are translations, transliterations, or other types of phonetic representations). Each language sub-model can also include a user history of a particular user, e.g., a dictionary of words and phrased often used by a particular user.

The detection engine 2110 includes an input module 2112 and a timing module 2114. The input module 2112 can, for example, receive input (e.g., keystrokes representing characters in a first writing system) to particular applications 2105 and send the received input to the IME engine 2106. In some implementations, the detection engine 2110 is a component of the IME engine 2106.

The detection engine 2110 can detect input in a first writing system (e.g., Pinyin input including Roman characters) and determine whether or not to send the input to the IME engine 2106. The IME engine 2106 can, for example, be implemented using the input method editor code 101 and associated data stores 104 and 106, and provide output candidates in a second writing system (e.g., lexical items such as Hanzi terms) to an interface (e.g., user interface 2102) as the input (e.g., graphemes such as Roman characters) is detected or based on predetermined delays from the timing module 2114.

The components of system 2100 can be communicatively coupled to one or more of each other. Though the components identified above are described as being separate or distinct, one or more of the components may be combined in a single process or routine. The functional description provided herein including separation of responsibility for distinct functions is by way of example. Other storage architectures can also be used. In particular, other groupings or other divisions of functional responsibilities can be made as necessary or in accordance with design preferences. For example, IME engine 2106 could perform the functions of detection engine 2110. As another example, input module 2112 and timing module 2114 could be combined into a single module.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving an input sequence of characters in a first writing system;
   identifying in the input sequence of characters one or more first subsequences of consecutive characters, where each subsequence represents a syllable in a different, second writing system;
   identifying from the one or more first subsequences of consecutive characters one or more second subsequences, where each second subsequence includes one or more consecutive first subsequences and represents a term in the different, second writing system;
   determining one or more boundaries that delimit the one or more second subsequences;

generating one or more selectable indicators for display in a user interface, where each of the one or more selectable indicators identifies a respective second subsequence delimited by the one or more boundaries;
receiving a user selection of a particular selectable indicator of the one or more selectable indicators, the particular selectable indicator identifying a particular second subsequence; and
moving a text cursor in the user interface to a position corresponding to the particular second subsequence.

2. The method of claim 1, further comprising:
determining, from the entire input sequence of characters, one or more first input candidates in a third writing system, where the third writing system is different from the first writing system and from the second writing system, and where each first input candidate corresponds to a sequence of one or more consecutive second subsequences; and
displaying the one or more first input candidates as selectable alternatives to the input sequence of characters.

3. The method of claim 2, further comprising:
detecting a trigger event; and
displaying, in the user interface, the selectable indicators in response to detecting the trigger event, where each selectable indicator identifies a respective second subsequence.

4. The method of claim 3, further comprising:
receiving a user selection of a first selectable indicator; and
determining, from a third subsequence of characters, one or more second input candidates in the third writing system, where the third subsequence includes all the second subsequences in the order in which they occur in the input sequence up to the particular second subsequence identified by the first selectable indicator.

5. The method of claim 4, further comprising:
displaying the one or more second input candidates as selectable alternatives to the third subsequence of characters instead of the first input candidates.

6. The method of claim 2, further comprising:
receiving a user input to move a text cursor to a particular first subsequence, where the text cursor identifies a current position for text entry; and
determining, from a third subsequence of characters, one or more second input candidates in the third writing system, where the third subsequence includes all the complete second subsequences in the order in which they occur in the input sequence up to the particular first subsequence, followed by all the first subsequences in the order in which they occur in the input sequence up to and including the particular first subsequence.

7. The method of claim 6, further comprising:
displaying the one or more second input candidates as selectable alternatives to the third subsequence of characters instead of the first input candidates.

8. The method of claim 2, where the first writing system is Latin, the different, second writing system is Pinyin, and the third writing system is Hanzi.

9. A method, comprising:
separating a plurality of characters inputted by a user into one or more tokens, where a token is a group of one or more characters and represents a syllable;
grouping the tokens into one or more token groups, where a token group is a group of one or more tokens and represents a term or phrase;
generating one or more boundaries for the token groups according to an operation granularity;
in response to receiving an input indicating an activation of a trigger, visually indicating the boundaries for the token groups with one or more selectable indicators, where each of the one or more selectable indicators identifies a respective token group delimited by the one or more boundaries;
receiving a user selection of a particular selectable indicator of the one or more selectable indicators, the particular selectable indicator identifying a particular token group; and
moving a text cursor in the user interface to a position corresponding to the particular token group.

10. The method of claim 9, where the operation granularity is selected from a group of granularities including:
a character level, where operations are performed on individual characters;
a token level, where operations are performed on tokens; and
a token group level, where operations are performed on token groups.

11. The method of claim 9, further comprising moving a caret one token group left or one token group right by pressing one or more hot keys, where the caret identifies a current position of text entry.

12. The method of claim 9, where the trigger is activated by one or more hot keys pressed by the user.

13. The method of claim 12, where when the one or more hot keys are pressed continuously, the one or more boundaries for the token groups are visually indicated using numbers.

14. The method of claim 9, where the one or more boundaries for the token groups are generated using a language model.

15. The method of claim 14, where each token group corresponds to a language model lattice item in the language model, where the language model lattice item is a lexical item.

16. The method of claim 9, further comprising selecting a token group in response to receiving an input selecting a boundary for the token group.

17. The method of claim 16, where the input selecting the boundary is generated by a hot key composed of a control key and a number that corresponds to the visual indicator for the boundary.

18. A system comprising:
a machine readable storage device including a program product; and
one or more processors operable to execute the program product and perform operations comprising:
receiving an input sequence of characters in a first writing system;
identifying in the input sequence of characters one or more first subsequences of consecutive characters, where each subsequence represents a syllable in a different, second writing system;
identifying from the one or more first subsequences of consecutive characters one or more second subsequences, where each second subsequence includes one or more consecutive first subsequences and represents a term in the different, second writing system;
determining one or more boundaries that delimit the one or more second subsequences;
generating one or more selectable indicators for display in a user interface, where each of the one or more selectable indicators identifies a respective second subsequence delimited by the one or more boundaries;

receiving a user selection of a particular selectable indicator of the one or more selectable indicators, the particular selectable indicator identifying a particular second subsequence; and moving a text cursor in the user interface to a position corresponding to the particular second subsequence.

19. A system comprising:

a machine readable storage device including a program product; and one or more processors operable to execute the program product and perform operations comprising:

separating a plurality of characters inputted by a user into one or more tokens, where a token is a group of one or more characters and represents a syllable;

grouping the tokens into one or more token groups, where a token group is a group of one or more tokens and represents a term or phrase;

generating one or more boundaries for the token groups according to an operation granularity;

in response to receiving an input indicating an activation of a trigger, visually indicating the boundaries for the token groups with one or more selectable indicators, where each of the one or more selectable indicators identifies a respective token group delimited by the one or more boundaries;

receiving a user selection of a particular selectable indicator of the one or more selectable indicators, the particular selectable indicator identifying a particular token group; and moving a text cursor in the user interface to a position corresponding to the particular token group.

20. A computer program product, encoded on a non-transitory computer readable medium, operable to cause data processing apparatus to perform operations comprising:

receiving an input sequence of characters in a first writing system;

identifying in the input sequence of characters one or more first subsequences of consecutive characters, where each subsequence represents a syllable in a different, second writing system;

identifying from the one or more first subsequences of consecutive characters one or more second subsequences, where each second subsequence includes one or more consecutive first subsequences and represents a term in the different, second writing system;

determining one or more boundaries that delimit the one or more second subsequences;

generating one or more selectable indicators for display in a user interface, where each of the one or more selectable indicators identifies a respective second subsequence delimited by the one or more boundaries;

receiving a user selection of a particular selectable indicator of the one or more selectable indicators, the particular selectable indicator identifying a particular second subsequence; and moving a text cursor in the user interface to a position corresponding to the particular second subsequence.

21. A computer program product, encoded on a non-transitory computer readable medium, operable to cause data processing apparatus to perform operations comprising:

separating a plurality of characters inputted by a user into one or more tokens, where a token is a group of one or more characters and represents a syllable;

grouping the tokens into one or more token groups, where a token group is a group of one or more tokens and represents a term or phrase;

generating one or more boundaries for the token groups according to an operation granularity; and in response to receiving an input indicating an activation of a trigger, visually indicating the boundaries for the token groups with one or more selectable indicators, where each of the one or more selectable indicators identifies a respective token group delimited by the one or more boundaries;

receiving a user selection of a particular selectable indicator of the one or more selectable indicators, the particular selectable indicator identifying a particular token group; and moving a text cursor in the user interface to a position corresponding to the particular token group.

* * * * *